Sept. 23, 1941.    G. BARTH    2,257,031
POWER AMPLIFIER
Filed Aug. 19, 1939    3 Sheets-Sheet 1

INVENTOR.
Gustav Barth
BY Stephen Cerstvik
ATTORNEY.

Sept. 23, 1941.   G. BARTH   2,257,031
POWER AMPLIFIER
Filed Aug. 19, 1939   3 Sheets-Sheet 2

INVENTOR.
Gustav Barth
BY
Stephen Cerstvik
ATTORNEY.

Sept. 23, 1941.　　　　　G. BARTH　　　　　2,257,031

POWER AMPLIFIER

Filed Aug. 19, 1939　　　3 Sheets-Sheet 3

INVENTOR.
Gustav Barth
BY
Stephen Cerstvik
ATTORNEY.

Patented Sept. 23, 1941

2,257,031

UNITED STATES PATENT OFFICE 2,257,031

POWER AMPLIFIER

Gustav Barth, Berlin, Germany, assignor to Siemens Apparate und Maschinen Gesellschaft mit beschränkter Haftung, Berlin, Germany, a corporation of Germany Application August 19, 1939, Serial No. 290,968
In Germany August 19, 1938

6 Claims. (Cl. 171—242)

This invention relates to translating devices and particularly to devices for translating a weak electric signal derived from a sensitive instrument into a related but far stronger current, capable of operating a motor.

An object of the invention is to provide a translating device which shall be controllable by a weak signal resulting from a departure from equilibrium conditions and shall be peculiarly appropriate to operate mechanisms for restoring these equilibrium conditions.

Another object is to provide an inexpensive translating device of this character which shall be of small weight and not require high operating voltages.

Other objects are to increase the efficiency and gain of devices of the above type, to reduce the load on a sensitive deviation-responsive instrument from which the controlling signal is derived, and to eliminate from such devices vacuum tubes and relay contacts or other delicate moving parts.

A further object is to provide improved means for automatically balancing, guiding or steering an airplane or other vehicle, and the invention will be described in detail in terms of an embodiment particularly adapted to attaining this specific object.

It is well known to equip an airplane with instruments which are sensitive to any departure or deviation from a prescribed course or orientation and deliver small electric signals proportional to the departure. The gyro horizon and the earth inductor compass are familiar examples of such instruments. But in order to hold the plane on its course it is necessary to exert considerable force on rudder, elevator and ailerons. It is out of the question to derive this force directly from the deviation-responsive instrument, since the instrument would thereby be so overloaded that its motions would be determined less by the deviation than by the load, which would render it useless. It is therefore customary to interpose a servo-motor between the deviation-responsive instrument and the airplane control surface and to supply the motor with power related to the signal. Even when this is done, however, some form of amplifier is essential, since it is imperative to keep the load on the deviation-responsive instrument as low as possible, whereas the servo-motor, particularly in a large airplane, must draw a substantial amount of power.

The two known types of amplifier used for this purpose are the relay and the standard vacuum tube amplifier. Each one is open to a number of objections. A relay is always either open or closed and this results in a discontinuous form of control which is reflected in a wobbly course and unnecessary consumption of power. Furthermore, the moving contacts of relays are inherently subject to deterioration.

A vacuum tube amplifier, to serve the purpose in hand, must have a high gain and must also deliver an amount of controlling power substantially in excess of the capacity of standard power tubes. This means that a number of output tubes must be placed in parallel and that the operating voltages for the amplifier must be high. Aside from the fact that to obtain the necessary high voltages the amplifier power supply unit must be expensive and heavy, the voltages themselves are dangerous in an airplane where quarters are cramped and the smallest possibility of sparkover must be rigorously guarded against.

An additional drawback which is of considerable importance is that the electrical parts of the deviation-responsive instrument and all auxiliary apparatus are electrically connected through the amplifier so that their electric potentials may be of opposite polarity with respect to the airplane body.

In view of the above-described situation which prevails in an airplane, I accomplish the objects of my invention by providing an amplifying-translating system which includes a novel electromagnetic device which I term a magnetic amplifier. Further, by employing four novel component units connected in a particular way, ample power is available to operate the servo-motor and no power is drawn until a deviation takes place, while the system as a whole is sensitive to a minute signal so that the load of the deviation-responsive device may be negligibly small.

More particularly, the invention consists in the novel construction and combination of parts hereinafter described, illustrated in the accompanying drawings and pointed out in the claims hereto appended; it being understood that various changes in form, proportion, size and minor details of construction within the scope of the claims may be resorted to without departing from the spirit or sacrificing any of the advantages of the invention.

For a clearer comprehension of the invention reference is directed to the accompanying drawings which illustrate a preferred embodiment thereof wherein.

Figure 1:
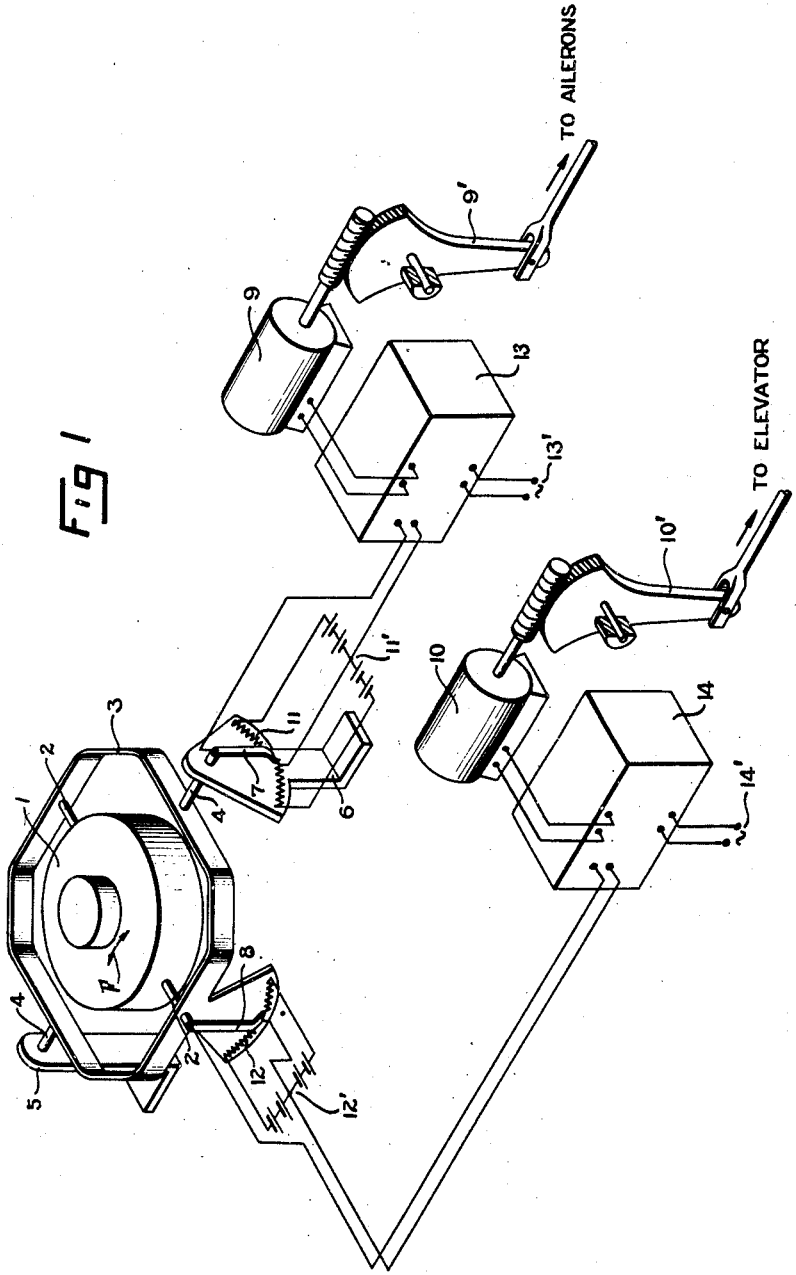
Fig. 1 shows schematically a device for restoring equilibrium conditions which makes use of two magnetic amplifier systems according to my invention.

Referring now to the figures, Fig. 1 shows diagrammatically an automatic stabilizing device arranged to compensate for departures of an object about two mutually perpendicular axes from its equilibrium position; for example, to compensate for the pitch and roll of an airplane, vessel, or vehicle about its longitudinal axis and its transverse axis respectively. For this purpose a convenient deviation-responsive device is "an absolute vertical indicator" in the form of a gyroscopic horizon. The gyroscopic horizon is equipped with a rotor, spinning rapidly about a vertical axis and suspended in gimbals in neutral equilibrium. The gyro is mounted in a housing 1 which is pivoted on journals 2 to rock about a transverse axis within a frame 3. The frame 3 is in turn supported by journals 4 in bearings 5, 6 to rock about the longitudinal axis of the airplane, whose direction of travel is indicated by the arrow F.

Extensions of the journals 2 and 4 are provided with contactors 8 and 7 arranged to swing over arcuate resistors 12 and 11 mounted, respectively, on the body of the plane and the outer frame 3.

A source of voltage 11', which may conveniently be a storage battery or the like, is connected to the ends of the resistor 11 and a similar source of voltage 12' is connected to the ends of the resistor 12. The midpoint of each battery is connected to the midpoint of its associated resistor. The input terminals of a unit 13, which includes a magnetic amplifier and such auxiliary apparatus as may be necessary, are connected to the midpoint of the battery 11' and to the movable contactor 7; and another magnet amplifier unit 14 is similarly connected to the battery 12' and the contactor 8.

The output terminals of the units 13 and 14 supply currents to the servo-motors 9 and 10 respectively which, through mechanical linkages 9' and 10' operate the control surfaces of the airplane. Additional terminals 13' and 14' of the magnet amplifiers 13 and 14 will be more fully described hereinafter. It should be observed at this point, however, that the power required to drive the motors 9 and 10 is derived from these terminals 13' and 14', the input terminals of the magnet amplifiers receiving only minute signals from the potentiometers 11 and 12. It will be noted further that the only load on the gyro horizon is the frictional resistance of the contactors 7 and 8 on the resistors 11 and 12; and if desired, even this may be eliminated in a well known manner.

Figure 2:
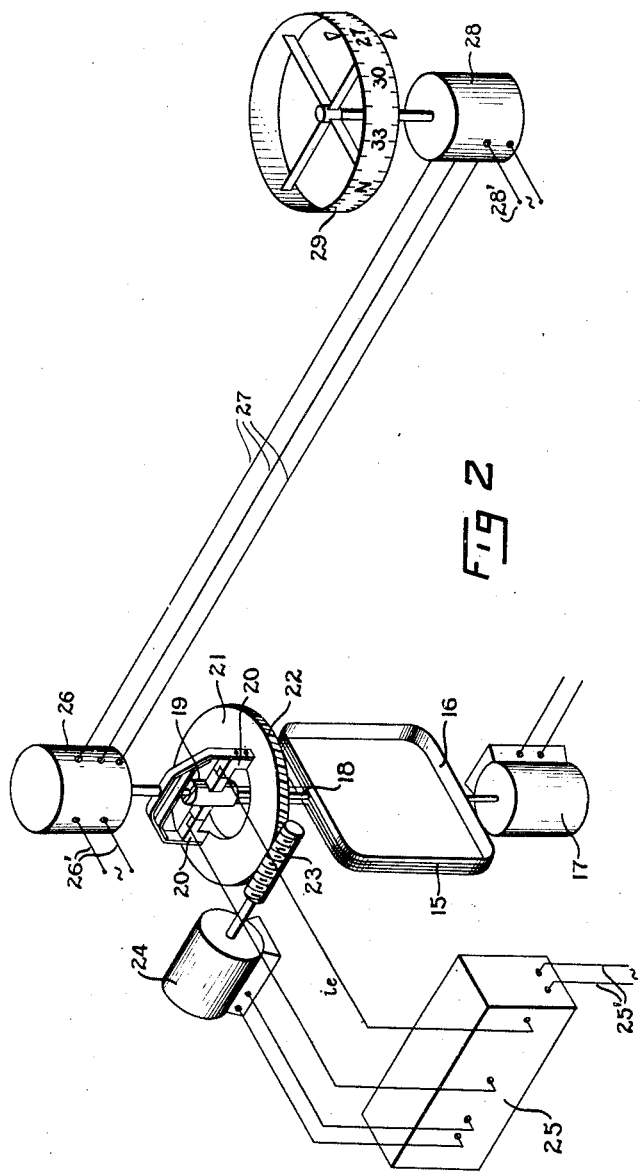
Fig. 2 shows schematically parts of a device for indicating the amount of deviation of a vehicle from a prescribed course, likewise making use of a magnetic amplifier system.

Fig. 2 shows an arrangement in which the control signal is derived from an earth inductor compass. A coil 15 is supported on a frame 16 mounted to rotate in the earth's magnetic field about a vertical axis and driven by a motor 17. At the upper end of the frame 16 is a shaft 18 which bears a commutator 19 which turns between brushes 20. The brushes are disposed on a plate 21 which may be turned in a horizontal plane. To this end, the plate is provided at its rim with a worm gear 22 which engages with a worm 23 driven by another motor 24. The controlling signal is derived from the brushes 20 which are connected to the input terminals of the magnetic amplifier 25, and the output terminals of the amplifier are connected to the motor 24.

A transmission device of a type known per se is provided for the teletransmission of the brush position of the earth inductor to the instrument panel of the airplane, conveniently located near the pilot's seat. In this transmission system a transmitter 26, mechanically coupled to the plate 21, is electrically connected to a receiver 28 which in turn is mechanically coupled to an indicator dial 29. The transmitter 26 and the receiver 28 may conveniently be a pair of matched self-synchronous motors, supplied with alternating current power through the terminals 26' and 28' in the well known manner.

The system as shown in Fig. 2 merely indicates to the pilot the departure of the airplane from a prescribed orientation in a horizontal plane, and the pilot may then operate the rudder manually to restore the airplane to its course. It will be understood, however, that if desired, the servo-motor 24 may be arranged to operate the rudder of the airplane instead of turning the plate 21, in which case the deviation itself is compensated instead of being merely indicated to the pilot.

Figure 3:
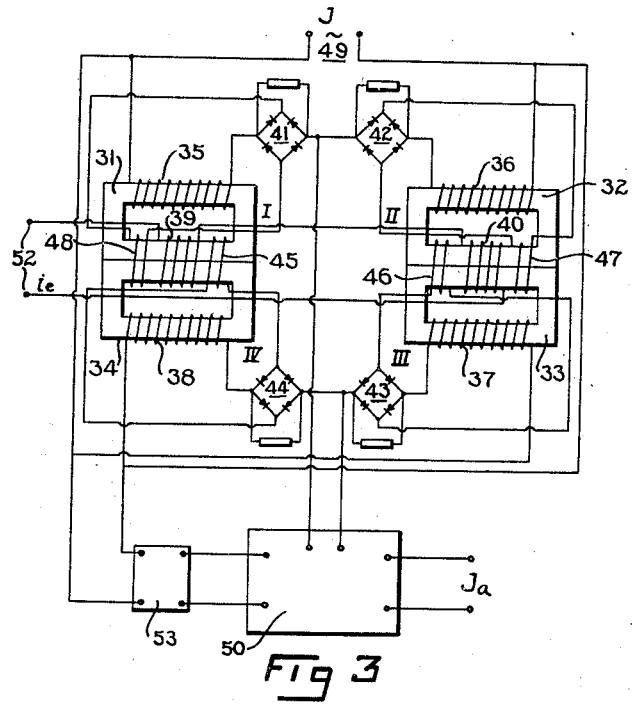
Fig. 3 shows in detail the wiring diagram of a magnetic amplifier according to my invention.

Fig. 3 shows in detail the internal connections of a magnetic amplifier according to my invention which, as above stated, is indicated in Figs. 1 and 2 by 13, 14 and 25. In this figure four units I, II, III, IV, are provided, each including a core, coils and a rectifier. The four cores 31, 32, 33 and 34 are composed of a material having a high magnetic permeability range, that is, a permeable but saturable material; for example, they may be composed of an iron-nickel alloy. The cores are arranged in pairs, 31 adjoining 34 and 32 adjoining 33, so that they are closely coupled. If desired, each pair may be replaced by a single three leg core. Four coils 35, 36, 37 and 38 are wound upon the cores as shown and a rectifier is connected in series with each of these windings. These rectifiers 41, 42, 43 and 44 are preferably full-wave copper-oxide rectifiers of well known type although rectifiers of any desired type will serve.

It will be observed by tracing the connections of Fig. 3 that the winding 35 and the rectifier 41 are connected in series with the winding 36 and the rectifier 42 across a source of alternating voltage 49, which may be any convenient low-voltage A. C. generator. Similarly, the winding 37 and the rectifier 43 are connected in series with the winding 38 and the rectifier 44 across the same source 49, but in the opposite sense. The coils 35 and 38 are wound upon the same composite core 31—34 and the windings 36 and 37 on the other composite core 32—33; and the coils are wound in such direction that voltage at the terminals 49 will produce, due to the winding 35, flux in the same circular direction as the flux produced in the same core due to the winding 38 by the same voltage at the terminals 49. Thus the fluxes in the core 31—34, due to the windings 35 and 38, are aiding fluxes so that the windings 35 and 38 constitute high inductive impedances.

The same considerations apply to the core 32—33 and the windings 36 and 37 so that these windings likewise constitute high inductive impedances.

It will be observed that the connections of Fig. 3 are such that the coils 35, 36, 37 and 38, with their associated rectifiers 41, 42, 43, and 44 constitute the four arms of a Wheatstone bridge. This arrangement is more clearly indicated in Fig. 4, where many connections have been omitted for the sake of clarity. In this bridge, however, the arm 35 is inductively coupled to the diagonally opposite arm 38 and the arm 36 is inductively coupled to the diagonally opposite arm 37.

Figure 4:
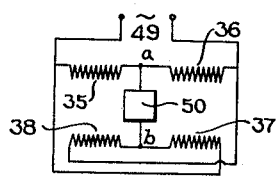
Fig. 4 is a schematic diagram illustrating certain aspects of my invention in simplified form.

This bridge is supplied with voltage from the alternating current terminals 49 and the midpoints of the bridge, indicated at $a$ and $b$ in Fig. 4, are connected to a phase-sensitive device 50 which will be more fully described below.

A coil 39 is wound about the central leg of the composite core 31—34 and a similar coil 40 is wound about the central leg of the composite core 32—33. These coils are wound in the same direction and placed in series with terminals 52 which carry the signal current.

Auxiliary coils 45 and 48 are similarly wound about the central leg of the composite core 31—34, and are connected to the output terminals of the rectifiers 44 and 41, respectively. Similarly, auxiliary coils 46 and 47 are wound on the central leg of the composite core 32—33 and connected respectively to the output terminals of the rectifiers 43 and 42.

A condenser is connected across the input terminals of each rectifier in the well-known manner, to reduce the alternating current impedance of the rectifiers.

Figure 5:
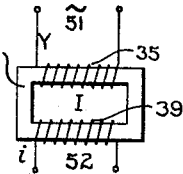
Fig. 5 is a wiring diagram illustrating one of the principles upon which my invention is based.

Fig. 5 shows some of the connections of one unit of Fig. 3 in simplified form and serves to explain the operation of the magnet amplifier. In Fig. 5, 31 again denotes the core of a permeable but saturable material. 35 indicates a coil which in Fig. 3 forms the bridge arm of the unit I and to which current is supplied from a source of alternating current 51. Another coil 39 is wound about the same core and corresponds generally with any of the windings 39, 45 and 48.

If an alternating current voltage is impressed at the terminals 51 a current Y will flow through the winding 35. The magnitude of this current is determined in large measure by the inductance of the coil 35 which in turn depends upon the permeability of the core 31. If a direct current $i$ be supplied to the terminals 52, the operating point of the core material on its B—H characteristic will be moved, and the permeability of the core 31 will in general be decreased so that the current Y increases.

The alternating current impedance of the coil 35 is consequently a function of the direct current $i$ in the coil 39 so that the magnitude of the current Y can be varied by controlling the magnitude of the direct current $i$.

Figure 6:
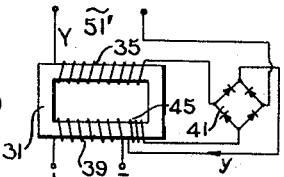
Fig. 6 is a wiring diagram illustrating the mode of operation of a part of my invention.

Fig. 6 shows, in addition to the core and windings of Fig. 5, a rectifier 41, its input terminals in series with the coil 35 across the source 51′ and an additional coil 45 wound on the core 31 and connected to the output terminals of the rectifier 41. When the direct current $i$ flowing in the winding 39 is zero, the alternating current Y flowing in the winding 35 is limited largely by the impedance of that winding. Through the coil 45 there flows a direct current $y$, derived from the rectifier 41 and related in magnitude to the alternating current Y. This current $y$ partly saturates the core 31, thereby changing the permeability of the core 31 and consequently the impedance of the winding 35 from the value it would otherwise have, exactly as explained above in connection with the effect of the current $i$ in the coil 39 of Fig. 5.

If now, in addition, a current $i$ be caused to flow through the winding 39 the saturation of the core 31 will either be increased or decreased depending on the direction of the winding 39 and the sense of the current $i$. In other words, the flux due to the current $i$ either adds to or subtracts from the flux due to the current $y$. If the effect is additive, the current Y will increase and so increase the current $y$. This will in turn increase the saturation of the core 31 and further reduce the impedance of the winding 35 so that the current Y will increase still further. Thus the action is cumulative giving rise to a large change in Y for a small change in $i$.

If, however, the sense of the current $i$ is such that the action is subtractive, there results partial or complete mutual neutralization of these effects depending upon the magnitude of the current $i$. Thus the current $i$ may be adjusted to exactly neutralize the flux due to the current $y$, giving rise to a maximum of the impedance of the winding 35 corresponding to a certain small value of the current $i$; and an increase of the current $i$ in the same sense will more than neutralize the flux due to the current $y$ so that the current Y again increases.

Figure 7:
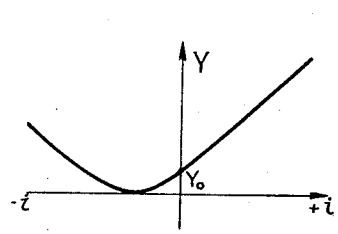
Fig. 7 is a graph showing the relation between the signal input to my amplifier and the output thereof.

These relations are shown graphically in Fig. 7 in which the minimum value of Y corresponds to a certain low value of $i$ which is negative with respect to $y$; and $Y_0$ is the value which the current Y obtains when the current $i$ is zero, due to partial saturation of the core 31 by the current $i$ alone.

Returning now to Fig. 3, advantage is taken of both of these phenomena, namely, the regenerative action when the fluxes are cumulative and the degenerative action when they are subtractive. The windings 39 and 40 are traversed by the input signal current derived from the deviation-responsive device; and this current, $i_e$, which corresponds to the current $i$ of Figs. 5 and 6 may be positive, negative or zero. The rectifiers 41, 42, 43 and 44 and their associated windings 45, 46, 47 and 48 operate in the manner described in connection with Fig. 6 to produce increase or decrease of the flux compared with the values the flux would have due to the current $i_e$ in the windings 39 and 40 alone.

It is important to note that the direction of the windings 45, 46, 47 and 48 with respect to the windings 39 and 40 is such that a given signal current $i_e$ will act oppositely on the two composite cores; for example, it will reduce the permeability of the core 31—34 and therefore the impedance of the coils 35 and 38 together, and at the same time it will increase the permeability of the core 32—33 and therefore the impedances of coils 36 and 37 together. But although magnetically coupled, the coils 35 and 38 constitute diagonally opposite arms of the Wheatstone bridge and likewise the coils 36 and 37 constitute the other two diagonally opposite arms of the same bridge. This arrangement, which is more clearly shown in Fig. 4, results in substantially doubling the sensitivity of the device over what it would be if the impedances 37 and 38, for example, were constant and only the impedances 35 and 36 varied by the current $i_e$.

A further advantage in the arrangement of my invention lies in the fact that since the coils 45, 46, 47 and 48 always link two cores a defect which would reside in the simpler arrangement of Figs. 5 and 6 is eliminated. In Fig. 5, the coils 35 and 39 are inductively coupled in such a way that undesirable electromotive forces would be induced in the coil 39 by change of the current Y in the winding 35. The same is true of the arrangement of Fig. 6 in which undesirable electromotive forces would be induced in the coils 39 and 45 by change of current Y in the coil 35. In the arrangement of Fig. 3, on the other hand, the directions of the windings 35 and 38 or 36 and 37 are such that the electromotive forces induced in the windings 39, 45 and 48 or 40, 46, and 47 by the currents flowing in the first mentioned windings will neutralize one another so that the above mentioned undesirable reaction cannot occur.

It will now be understood that when an alternating voltage is supplied to the terminals 49, and the signal current $i_e$ is zero, which corresponds to the airplane equipped with the apparatus of Fig. 1 following its true path without pitch or roll, the bridge of Fig. 3 is balanced, all the impedances 35, 36, 37 and 38 being equally high. Therefore, the voltage across the midpoints $a$, $b$, of the bridge, is zero. If, however, the airplane departs from its prescribed orientation, the deviation-responsive device will deliver a signal current, positive or negative, to the coils 39 and 40, which will increase the saturation of one pair of cores and decrease the saturation of the other pair. The bridge will then be doubly unbalanced and a substantial voltage will appear at the points $a, b$.

If now the signal current $i_e$ should reverse its direction due to a change in the sense of the deviation of the airplane from its preassigned course, units II and III will interchange their roles with units I and IV so that if, for example, units I and IV at first operated cumulatively and units II and III differentially, units I and IV will now operate differentially and units II and III cumulatively. When the bridge is unbalanced in one direction the voltage impressed on the points $a$, $b$, is in a certain phase; and when the bridge is unbalanced in the opposite direction this voltage is in opposite phase. As the signal current $i_e$ passes through its zero value the voltage at the points $a$, $b$, decreases, passes through zero, and increases again in opposite phase.

The midpoints $a$, $b$ of the bridge are connected to the input terminals of a "phase-sensitive" device 50. This device is of the sort which responds to the variation of an alternating voltage or current both in magnitude and in phase. It is supplied at the points $c$, $d$, with a reference voltage or current of standard magnitude and phase which is preferably derived from the source 49. Utilizing the same source for these two purposes ensures that their frequencies shall be identical. As shown, the terminals $c$, $d$ are directly connected to the terminals 49 with the interposition of a phase advancer 53.

It is the function of the phase-sensitive device 50 to supply to the ultimate receiver, for example any one of the servo-motors 9, 10, or 24, a direct current $J_a$ which is substantially proportional to the magnitude of the alternating current input to the device 50 but which changes its sign when the alternating current input undergoes a phase reversal. This result may be attained by the use of circuit arrangements which make the current $J_a$ proportional to the magnitude of the alternating current input to the terminals $a$, $b$ and also to the cosine of the phase angle between this voltage and the standard voltage on the terminals $c$, $d$.

Figure 8:
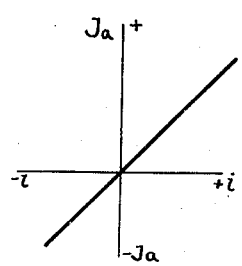
Fig. 8 is a graph showing the relation between the signal input to my amplifier and the input to the servo-motor which operates the control surface.

The phase advancer 53, which may be of any desired type, is interposed between the source 49 and the terminals $c$, $d$, to advance or retard the phase of the standard voltage by a preassigned amount in order that the cosine shall change from positive to negative, and so change the sign of the output current $J_a$, when the signal current $i_e$ is zero. The phase rotation in the phase advancer 53 may be preset or may be controllable at the will of the operator. Indeed, control of the phase rotation within the device 53 constitutes a convenient means of controlling the amplification and therefore the sensitivity of the translating device as a whole. The performance of the phase-sensitive device 50 is represented in Fig. 8. As above stated, the magnitude of the output direct current $J_a$ is proportional to the magnitude of the bridge current; but it changes its sign and becomes negative when the bridge current passes through a phase reversal. It is therefore substantially proportional both in magnitude and sign to the input signal current $i_e$, so that the servo-motor will, finally, operate the control surfaces of the airplane in proportion to the deviation.

The phase-sensitive device may be a mechanical rectifier, a dry rectifier bridge connection, a tube rectifier, a fork modulator, a ring modulator, or any other type of modulator, connected either singly or in "push-pull."

I have found that the sensitivity and gain of the system according to my invention are adequate to operate the servo-motors which move the control surfaces of an airplane and that it is easily actuated by the small signal currents delivered by a gyro horizon or an earth inductor without overloading the latter. Its efficiency is many times that of a tube amplifier. It may be of compact, rugged, and inexpensive construction and of low weight. Both the required source voltages and the induced voltages are low so that the danger of accident is substantially eliminated. Lastly, the only coupling between the signal source and the remainder of the apparatus is inductive, and there is no direct electric connection at all.

In the arrangement above described the signals actuating my translating device have been proportional to the departure or deviation of the airplane from a preassigned position or course. It will be understood that my invention is equally adapted to receive and translate signals derived from the velocity or acceleration of such deviation in the well known manner.

Though, for the sake of clearer illustrations, I have described the invention in connection with a device for indicating or compensating for deviation of a vehicle from a position or course, it will be understood that it may have a large number of entirely different uses. Indeed, I apprehend that it may be useful in any field where it is desired to translate a minute electric signal into a strong electric voltage or current which is directly proportional thereto. The above description is therefore not to be taken as in any way restrictive, the scope of the invention being defined rather by the appended claims.

What is claimed is:

1. A magnetic amplifier comprising a first magnetizable core carrying a first winding, a second magnetizable core carrying a first winding, an alternating current source for energizing said windings, rectifying means for each of said windings and connecting said windings in series, a second winding for the first core, a second winding for the second core, rectifying means for each of said second windings and connecting said second windings in series opposed relation to said first windings for energization by said alternating current source, a direct current input circuit including a third winding on the first core and a third winding on the second core, the third winding of one core being connected in aiding relation with the third winding of the other core, a first pair of auxiliary windings on said first core and connected to the output of the rectifying means of the first and second windings of the first core, whereby direct current flows in said pair of auxiliary windings in accordance with the alternating current in said first and second windings of the first core, a second pair of auxiliary windings on said second core and connected to the output of the rectifying means of the first and second windings of the second core whereby direct current flows in said second pair of auxiliary windings in accordance with the alternating current in said first and second windings of the second core, the first pair of auxiliary windings of the first core being wound in opposed relation to the second pair of windings of the second core, and means electrically connected to the output of the first and second windings of the two cores and to said alternating current source.

2. A magnetic amplifier comprising a first magnetizable core carrying a first winding, a second magnetizable core carrying a first winding, an alternating current source for energizing said windings, rectifying means for each of said windings and connecting said windings in series, a second winding for the first core, a second winding for the second core, rectifying means for each of said second windings and connecting said second windings in series opposed relation to said first windings for energization by said alternating current source, a direct current input circuit including a third winding on the first core and a third winding on the second core, the third winding of one core being connected in aiding relation with the third winding of the other core, a first pair of auxiliary windings on said first core and connected to the output of the rectifying means of the first and second windings of the first core whereby direct current flows in said pair of auxiliary windings in accordance with the alternating current in said first and second windings of the first core, a second pair of auxiliary windings on said second core and connected to the output of the rectifying means of the first and second windings of the second core whereby direct current flows in said second pair of auxiliary windings in accordance with the alternating current in said first and second windings of the second core, the first pair of auxiliary windings of the first core being wound in opposed relation to the second pair of windings of the second core, a phase shifting device connected to said alternating current source, and means electrically connected to said phase shifting device and to the output of the first and second windings of the two cores.

3. A magnetic amplifier comprising a first magnetizable core carrying a first winding, a second magnetizable core carrying a first winding, an alternating current source for energizing said windings, rectifying means for each of said windings and connecting said windings in series, a second winding for the first core, a second winding for the second core, rectifying means for each of said second windings and connecting said second windings in series opposed relation to said first windings for energization by said alternating current source, a direct current input circuit including means carried by each of said cores and connected in aiding relation, a first auxiliary winding on the first core connected to the output of the rectifying means of the first winding of the first core whereby direct current flows therethrough, a second auxiliary winding on the first core connected with the output of the rectifying means of the second winding of the first core whereby direct current flows therethrough, a first auxiliary winding on the second core connected with the output of the rectifying means of the first winding of the second core whereby direct current flows therethrough, a second auxiliary winding on the second core connected with the output of the rectifying means of the second winding of the second core whereby direct current flows therethrough, said first and second auxiliary windings of the first core being wound in opposed relation to the first and second auxiliary windings of the second core, and means electrically connected to the output of the first and second windings of the two cores and to said alternating current source.

4. A magnetic amplifier comprising a first magnetizable core carrying a first winding, a second magnetizable core carrying a first winding, an alternating current source for energizing said windings, rectifying means for each of said windings and connecting said windings in series, a second winding for the first core, a second winding for the second core, rectifying means for each of said second windings and connecting said second windings in series opposed relation to said first windings for energization by said alternating current source, a direct current input circuit including means carried by each of said cores and connected in aiding relation, a first auxiliary winding on the first core connected to the output of the rectifying means of the first winding of the first core whereby direct current flows therethrough, a second auxiliary winding on the first core connected with the output of the rectifying means of the second winding of the first core, whereby direct current flows therethrough, a first auxiliary winding on the second core connected with the output of the rectifying means of the first winding of the second core whereby direct current flows therethrough, a second auxiliary winding on the second core connected with the output of the rectifying means of the second winding of the second core whereby direct current flows therethrough, said first and second auxiliary windings of the first core being wound in opposed relation to the first and second auxiliary windings of the second core, a phase shifting device connected to said alternating current source, and means electrically connected to said phase shifting device and to the output of the first and second windings of the two cores.

5. A magnetic amplifier comprising a first magnetizable core carrying a first winding, a second magnetizable core carrying a first winding, an alternating current source for energizing said windings, rectifying means for each of said windings and connecting said windings in series relation, a second winding for the first core, a second winding for the second core, rectifying means for each of said second windings and connecting said second windings in series opposed relation to said first windings for energization by said alternating current source, a pair of auxiliary windings for the first core, one of said auxiliary windings being connected to the output of the rectifying means of the first winding of the first core and the other of said auxiliary windings being connected to the output of the rectifying means of the second winding of the first core, a second pair of auxiliary windings for the second core, one of the last-named auxiliary windings being connected to the output of the rectifying means of the first winding of the second core and the other of said last-named auxiliary windings being connected to the output of the rectifying means of the second winding of the second core, the first pair of auxiliary windings of the first core being wound in opposed relation to the auxiliary windings of the second core, each pair of said auxiliary windings acting to vary the permeability of their respective cores in accordance with the alternating current flowing in the first and second windings of each of said cores, a direct current input circuit including a winding on the first core and a winding on the second core in aiding relation with the first input winding for additionally varying the permeability of said cores in accordance with the direct current flowing in said input circuit and arranged so that with direct current flow in one direction in the input circuit the effect of one pair of auxiliary windings together with one of the input windings is cumulative upon the related core and the effect of the second pair of auxiliary windings together with the second input winding is differential in the second core, and means electrically connected to the rectifying means of the first and second windings of each of the cores and to said alternating current source.

6. A magnetic amplifier comprising a first magnetizable core carrying a first winding, a second magnetizable core carrying a first winding, an alternating current source for energizing said windings, rectifying means for each of said windings and connecting said windings in series relation, a second winding for the first core, a second winding for the second core, rectifying means for each of said second windings and connecting said second windings in series opposed relation to said first windings for energization by said alternating current source, a pair of auxiliary windings for the first core, one of said auxiliary windings being connected to the output of the rectifying means of the first winding of the first core and the other of said auxiliary windings being connected to the output of the rectifying means of the second winding of the first core, a second pair of auxiliary windings for the second core, one of the last-named auxiliary windings being connected to the output of the rectifying means of the first winding of the second core and the other of said last-named auxiliary windings being connected to the output of the rectifying means of the second winding of the second core, the first pair of auxiliary windings of the first core being wound in opposed relation to the auxiliary windings of the second core, each pair of said auxiliary windings acting to vary the permeability of their respective cores in accordance with the alternating current flowing in the first and second windings of each of said cores, a direct current input circuit including a winding on the first core and a winding on the second core in aiding relation with the first input winding for additionally varying the permeability of said cores in accordance with the direct current flowing in said input circuit and arranged so that with direct current flow in one direction in the input circuit the effect of one pair of auxiliary windings together with one of the input windings is cumulative upon the related core and the effect of the second pair of auxiliary windings together with the second input winding is differential in the second core, a phase shifting device connected to said alternating current source, and means electrically connected to said phase shifting device and the output of the first and second windings of the two cores.

GUSTAV BARTH.